United States Patent [19]
Colin

[11] 3,878,949
[45] Apr. 22, 1975

[54] DEVICE FOR LOADING MATERIALS INTO A CONTAINER

[75] Inventor: Marcel Victor Auguste Colin, Lagord, France

[73] Assignee: Societe d'Equipements, Manutentions et Transports (S.E.M.A.T.), Paris, France

[22] Filed: Sept. 22, 1972

[21] Appl. No.: 291,275

[52] U.S. Cl. ............................................. 214/83.3
[51] Int. Cl. .............................................. B65f 3/00
[58] Field of Search ................ 214/83.3;503, 17 C; 100/233

[56] References Cited
UNITED STATES PATENTS

| | | | |
|---|---|---|---|
| 3,402,837 | 9/1968 | Palmer et al. ...................... | 214/83.3 |
| 3,499,558 | 3/1970 | Rey ..................................... | 214/83.3 |
| 3,559,825 | 2/1971 | Meyer et al. ....................... | 214/83.3 |
| 3,572,526 | 3/1971 | Gollnick ............................. | 214/83.3 |

Primary Examiner—Albert J. Makay
Attorney, Agent, or Firm—Ulle C. Linton

[57] ABSTRACT

This device for loading materials, notably town refuse, into a container, notably a dry refuse collection vehicle, comprises a transverse rake mounted in said container above the bottom of the inlet hopper thereof; this rake has depending teeth mounted to a hollow shaft surrounding freely a concentric eccentric shaft, said eccentric rake and shaft assembly constituting a crank shaft adapted to be driven from a pair of lateral hydraulic rams engaging segments rigid with said crank shaft; guide means of the slideway and slide block type are provided for causing the tips of the rake teeth to follow an elongated closed circuit for compressing the material into the container. Said rams are controlled through distributors directly responsive to cam contours formed on the relevant segments. (FIG. 1).

3 Claims, 3 Drawing Figures

PATENTED APR 22 1975 3,878,949
Fig.1
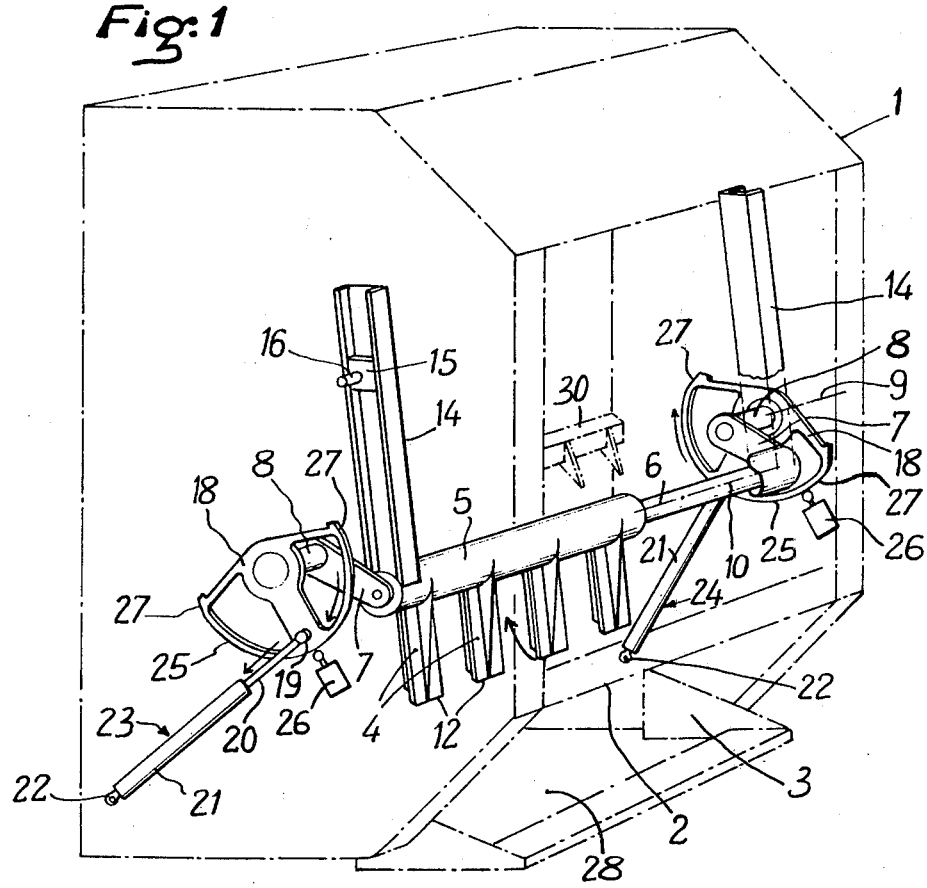
Fig.2
Fig.3
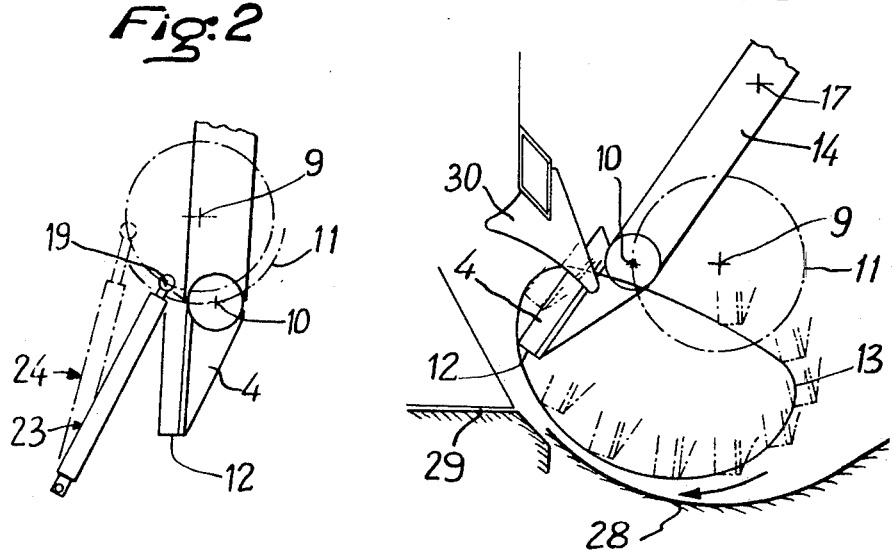

DEVICE FOR LOADING MATERIALS INTO A CONTAINER

BACKGROUND OF THE INVENTION

This invention relates in general to devices for loading materials into a container, notably but not exclusively for loading town refuse or dry refuse whether of residential, commercial or industrial origin, into collection vehicles.

DESCRIPTION OF THE PRIOR ART

It is known to use notably for refuse collection purposes a device comprising essentially a rake provided with integral sturdy teeth and movable within a collection hopper communicating with the bottom of the container of the vehicle, or van, this rake being driven continuously along a closed circuit so as to move towards the container or van along the lower portion or run of this circuit for compressing the refuse into the container and thus increase the amount the vehicle can accomodate.

In most examples the mechanisms used to this end are relatively complicated and comprise a great number of parts, thus forming a heavy, cumbersome, noisy assembly subjected to considerable stress and of relatively high cost.

SUMMARY OF THE INVENTION

It is the essential object of the present invention to provide a loading device of the movable rake type mentioned hereinabove but of particularly simple construction, which is relatively light in weight, operates relatively noiselessly and of which the various component elements are subjected only to moderate stress.

The primary feature characterising this invention lies in the fact that the body of the movable rake comprises a hollow shaft mounted for loose rotation about a coaxial rectilinear main eccentric section of a crank shaft revolving about an axis parallel to the axis of said hollow shaft and driven from a suitable mechanism, guide means being provided for imparting a predetermined orientation to said rake for each angular position of said crank shaft.

The arrangement broadly set forth in the preceding paragraph is advantageous in that the torsion stresses produced during the operation of the device cannot be transmitted from the crank shaft to the rake so as to accrue them and thus reach abnormal stress values; on the other hand, the hollow rake shaft and the crank shaft withstand respectively the stress of the other coaxial eccentric shaft associated therewith in order to assist in absorbing the stress applied thereto.

According to a complementary feature characterising this invention the ends of the movable rake teeth are rigid with a pair of corresponding rectilinear slideways each adapted to slide along a guide slide block or shoe having an integral trunnion and adapted in turn to pivot freely about an axis, the two slide trunnions being aligned on a common axis parallel to the hollow shaft axis.

As a consequence of the provision of guide means comprising said rectilinear slideways associated with pivoting slide blocks, only negligible stresses are transmitted to the slide block trunnions during the operation, since the slideways can slide freely on said slide blocks adapted in turn to pivot freely about their aligned axes. As a result, the construction may be relatively light in weight and operate noiselessly. The cost of this device, requiring but a relatively small number of parts, may thus be reduced in comparison with that of known equivalent devices.

In order to take the fullest advantage of the structure according to this invention, it is particularly efficient to drive the crank shaft at both ends by means of a pair of lateral hydraulic rams or like actuators acting as power rods, and also to off-set these lateral rams in relation to each other so that their top dead centres correspond to different angular positions of the crank shaft, whereby the latter will be driven continuously, without any dead spot. Moreover, this arrangement permits of automatically controlling the distribution of operating fluid to the two rams by means of cams rigid with the crank shaft which act directly upon the distributors controlling the rams without requiring the use of solenoid operated valves and complicated control systems.

In order to afford a clearer understanding of this invention and of the various features and advantages characterising same, reference will now be made to the accompanying drawing illustrating diagrammatically by way of example a typical form of embodiment of the invention. In the drawing:

BRIEF DESCRIPTION OF THE DRAWING

FIG. 1 is a perspective view of the loading device according to this invention, of which certain elements have been removed for the sake of clarity, FIG. 2 is a corresponding side elevational view of a detail, as seen from the left-hand side of the device, and FIG. 3 is a diagram showing in section taken along a vertical plane perpendicular to the axis of oscillation of the rake, the closed-circuit path followed by the tips of the teeth of said movable rake during a continuous movement of this rake.

DESCRIPTION OF THE PREFERRED EMBODIMENTS

In the exemplary form of embodiment illustrated it is assumed that the invention is applied to the loading of a refuse collection vehicle, i.e. for collecting town, commercial or industrial dry refuse, and FIG. 1 illustrates in dash-and-dot lines the rear portion of the external van or body housing 1 of the vehicle comprising at its bottom and rear end an aperture 2 for discharging the refuse to be loaded into a receiving hopper 3 communicating at its front end (referring to the normal driving direction of the vehicle) with the bottom of the van into which the refuse or other materials are forced and compressed by the loading device constituting the subject-matter of this invention.

According to this invention, the movable rake for compressing the refuse to be loaded comprises a set of strudy teeth 4 depending from and integral with a hollow shaft 5 mounted for loose rotation on a rectilinear section 6 of a crank shaft having radial arms 7 disposed at either ends of said section 6. These arms 7 extend between the rectilinear section 6 of the crank shaft and the corresponding stub shafts or trunnions 8 are mounted in bearings fitted in lateral casings so as to revolve about a horizontal fixed axis 9 (FIGS. 2 and 3) extending transversely in the rear portion of the van and parallel to the common axis 10 of the eccentric coaxial shafts 5, 6 which describes a cylinder of revolution 11 about the fixed axis 9. It will be seen that the crank shaft 6, 7 and 8 constitutes a rigid rotating member adapted to carry the movable rake and driven through any suitable means of which a typical form of embodiment will be described in the following disclosure.

With this construction, when the axis 10 describes a cylindrical path 11 the rake teeth 4 assume a variable orientation according to the momentary position of said axis 10 on cylinder 11, whereby the tips 12 of said rake teeth describe a substantially elliptic cylinder 13 having its cross-sectional contour elongated in the operative direction. To this end, the rake tube ends are each rigid with a guide arm 14 extending upwards and acting as a position-control member, i.e. controlling the desired rake oscillation. According to a complementary feature of the present invention, each guide arm 14 consists of a rectilinear slideway adapted to engage a corresponding slide block or shoe 15 adapted to pivot freely about a fixed axis by means of an integral trunnion 16. These trunnions 16 are aligned on a common axis 17 (FIG. 3) parallel to the axes 9, 10 and their positions are such that during the operation they complete the kinematic actuation of the refuse compressing rake, as will be readily understood from the foregoing and from the attached drawing. It may be pointed out that the rake portions 4, 5 and 14 constitute a rigid assembly mounted for loose rotation about the crankpin constituted by the rectilinear section 6 of the crank shaft 6, 7 and 8, whereby no stress is applied between the two assemblies 4, 5, 14 and 6, 7, 8; however, each one of these last-named assemblies assists the other for withstanding flexion stress.

Although the rake may be driven through any suitable means, a typical and preferred form of embodiment of a drive suitable for this purpose will now be described with reference to the drawing. This drive is particularly simple, efficient and noiseless. In the example illustrated diagrammatically in the drawing each crank shaft, stub shaft of trunnion 8 is rigidly assembled with a plain segment 18 acting as a driving crank and pivotally connected to the outer end 19 of the piston rod 20 of a double-acting hydraulic ram having its cylinder 21 pivoted to a fixed pin 22; it is celar that the segment 18 is adapted to rotate in a plane perpendicular to the axes 9, 10 and that the actuators or rams 20, 21 oscillate in a parallel plane also perpendicular to said axes 9, 10.

In order to drive the crank shaft 5, 6, 7 through the lateral rams with a continuous motion without any dead spot, these rams shown generally at 23, 24 in FIG. 2 are so mounted that the pivotal connections of their piston rods 19 are off set angularly from each other in one direction perpendicular to the axes 9, 10, as clearly shown in the drawing.

The above-described arrangement is also adapted to control automatically and very simply the rams 23, 24. To this end, the outer periphery of each segment 18 has an integral cam contour 25 for actuating a reversing distributor 26 controlling in turn the supply of hydraulic fluid under pressure to the relevant ram. The major portion of the operating cam contour 25 controls the distributor 26 for retracting the associated ram and covers approximately a half-circumference, and at the ends of this main portion the cam 25 comprises two short portions 27 partially recessed for controlling a temporary or intermediate position of distributor 26 wherein the two chambers of the associated double-acting ram communicate with the fluid reservoir in the vicinity of the dead centre position of this ram, whereby the latter can be driven freely by the other ram having a certain time-lag or lead in relation to said associated ram; in other words, the two rams cannot under any circumstances be simultaneously in their dead centre positions. Finally, when the distributor 26 is not acted upon by the cam 25, i.e. for a greater angle of rotation approximating 180° corresponding to the maximum piston rod extension of this ram, the distributor 26 is caused to reverse the control action exerted on the associated ram. In the position shown in FIG. 1 it is assumed that the movable rake is accomplishing its operative or positive function, i.e. compressing the materials or refuse into the container by moving towards the latter as shown by the arrows, the ram 23 being retracted while the other ram 24 has reached its dead centre position and is being neutralised by the cam section 27.

To simplify the drawing the hydraulic circuit supplying hydraulic fluid to the rams are not shown, the components elements of this circuit may be of the conventional type and comprise a distributor and a source of fluid under pressure, consisting for example of a pump driven from the engine of the collection vehicle.

The mode of operation of this device will be readily inferred from the above detailed description, and may be summarized as follows: Assuming that the hydraulic circuits of the rams are operated continuously for loading the van, these rams will so drive the rake that the tips 12 of its teeth will describe their closed circuit path 13 in the direction of the arrow (FIG. 3), by moving close to the bottom 28 of the hopper towards the bottom 29 of the loading van when the rake is in its lower position, and returning backwards when the rake is in its upper position. Thus, the rake will force towards the container or van the materials introduced into the bottom of said hopper 3. These materials are thus compressed and partially crushed by means of a fixed rake 30, the teeth 4 of the movable rake passing through the teeth of said fixed rake 30, in the forward position of said movable teeth, as shown in FIG. 3; it will be seen that in this position the movable rake is moving upwards so that its teeth 4 move inbetween the teeth of the fixed rake 30 retaining the materials and removing same off the movable teeth 4. During the backward movement of the movable rake the teeth 4 thereof travel above the incoming materials being poured continuously into the receiving hopper 3, and at the end of the return or backward movement of the movable rake the teeth 4 thereof are directed towards the bottom 28 of this hopper for resuming an operative or compression stroke. Thus, a continuous handling of the load is obtained.

Of course, this continuous operation may be discontinued at will and converted for example into an intermittent operation by neutralising the hydraulic supply circuit associated with the rams and controlling these rams through any suitable hand-operated auxiliary distributor. This auxiliary distributor may also be adapted to reverse the mode of operation of the rams so that the tips 12 of the rake teeth move along the same path 13 but in the opposite direction, notably when discharging the collection vehicle, an operation adapted to be performed without dumping, by using a movable ejector member disposed within the container or van, while the device of this invention is operated in the reverse direction.

I claim:

1. A device for loading and compressing material, notably town dry refuse, into a container on a collection vehicle, comprising a horizontal transverse crank shaft rotatably mounted in bearings provided in the lateral walls of a receiving hopper of said container, hydraulic rams associated with said crank shaft to impart thereto a circular movement around an axis of said crank shaft within said receiving hopper, a moveable comb comprising a hollow shaft mounted for loose rotation on said transverse crank shaft and provided with downwardly disposed sturdy teeth, slideways, rigid with said hollow shaft and disposed upwardly at each end thereof, and slide blocks along which said slideways can slide freely, said slide blocks being pivotally mounted on the side walls of the receiving hopper by means of pins parallel to the axis of said hollow comb shaft, and the teeth and said movable comb following a substantially elliptic closed circuit path within said receiving hopper when said crank shaft follows its circular movement.

2. A device as set forth in claim 1, wherein said crank shaft carries at both ends a trunnion adapted to revolve about a fixed axis, each crank shaft trunnion being rigid with a driving crank, the assembly further comprising, associated with each driving crank, said hydraulic rams having cylinders pivotally mounted to the side walls of said hopper, the piston rod of each ram being pivotally connected to the corresponding driving crank, the pivotal connections between said rams and said driving cranks being off-set in relation to each other so that said rams are in their dead centre positions at different angular positions of said crank shaft.

3. A device as set forth in claim 2, wherein said driving cranks consist each of a segment of which the outer periphery has a cam contour, the assembly comprising a distributor associated with each segment for controlling the relevant ram, each distributor being operatively connected and responsive to said cam contour, whereby the piston rod of each ram can act as a driving rod upon said segment under the control of said distributor.

* * * * *